US011642937B2

(12) United States Patent
Mizuno et al.

(10) Patent No.: US 11,642,937 B2
(45) Date of Patent: May 9, 2023

(54) VEHICLE CONTROL DEVICE AND VEHICLE CONTROL SYSTEM

(71) Applicant: SUBARU CORPORATION, Tokyo (JP)

(72) Inventors: Takako Mizuno, Tokyo (JP); Takuya Arai, Tokyo (JP); Koutarou Kimura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/223,618

(22) Filed: Apr. 6, 2021

(65) Prior Publication Data
US 2021/0309074 A1 Oct. 7, 2021

(30) Foreign Application Priority Data
Apr. 7, 2020 (JP) .............................. JP2020-069113

(51) Int. Cl.
*B60H 1/00* (2006.01)
(52) U.S. Cl.
CPC ..... *B60H 1/00771* (2013.01); *B60H 1/00357* (2013.01); *B60H 1/00742* (2013.01)
(58) Field of Classification Search
CPC ............ B60H 1/00771; B60H 1/00778; B60H 1/00735; B60H 1/00742; B60H 1/00357; B60H 1/00657
See application file for complete search history.

(56) References Cited

U.S. PATENT DOCUMENTS

| 2015/0127215 | A1* | 5/2015 | Chatterjee | .......... B60H 1/00642 701/1 |
| 2016/0207375 | A1* | 7/2016 | Gauthier | ............ B60H 1/00778 |
| 2017/0368906 | A1* | 12/2017 | Inui | ..................... B60H 1/00771 |
| 2018/0009290 | A1* | 1/2018 | Inui | ....................... F25B 47/006 |
| 2021/0309074 | A1* | 10/2021 | Mizuno | ............. B60H 1/00778 |

FOREIGN PATENT DOCUMENTS

| JP | 2013142517 A | * | 7/2013 | |
| JP | 2015-95971 A | | 5/2015 | |
| JP | 2019064358 A | * | 4/2019 | |
| WO | WO-2019077998 A1 | * | 4/2019 | .............. B60H 1/00 |

OTHER PUBLICATIONS

JP-2019064358-A English Machine Translation (Year: 2019).*
WO-2019077998-A1 English Machine Translation (Year: 2019).*
JP-2013142517-A English Machine Translation (Year: 2013).*

* cited by examiner

*Primary Examiner* — Jenna M Hopkins
(74) *Attorney, Agent, or Firm* — Troutman Pepper Hamilton Sanders LLP

(57) ABSTRACT

A vehicle control system includes a position identifying unit, a route information acquiring unit, a control information determining unit, and a control unit. The position identifying unit is configured to identify an expected boarding position where an occupant is to get in a vehicle. The route information acquiring unit is configured to acquire route information of the occupant to the expected boarding position. The control information determining unit is configured to determine, on the basis of the route information, a set temperature, a control start timing, or both as control information to be used for pre-air conditioning control for a vehicle compartment space of the vehicle. The control unit is configured to perform at least the pre-air conditioning control on the basis of the control information.

6 Claims, 12 Drawing Sheets

VEHICLE CONTROL DEVICE AND VEHICLE CONTROL SYSTEM

CROSS-REFERENCE TO RELATED APPLICATIONS

The present application claims priority from Japanese Patent Application No. 2020-069113 filed on Apr. 7, 2020, the entire contents of which are hereby incorporated by reference.

BACKGROUND

The technology relates to air conditioning control of a vehicle. For example, the technology relates to a vehicle control device and a vehicle control system related to pre-air conditioning control of a vehicle.

A vehicle includes an air conditioning control device to make an occupant present in a vehicle compartment comfortable. The air conditioning control device sometime performs pre-air conditioning control to bring a space in the vehicle compartment into a comfortable state before the occupant gets in the vehicle (e.g., Japanese Unexamined Patent Application Publication No. 2015-095971).

For example, a known technique of the pre-air conditioning control attains a set temperature immediately before an occupant gets in a vehicle, by controlling an air conditioning device (e.g., start timing) on the basis of position information of a mobile terminal used by the occupant and position information of the vehicle.

SUMMARY

An aspect of the technology provides a vehicle control system including a position identifying unit, a route information acquiring unit, a control information determining unit, and a control unit. The position identifying unit is configured to identify an expected boarding position where an occupant is to get in a vehicle. The route information acquiring unit is configured to acquire route information of the occupant to the expected boarding position. The control information determining unit is configured to determine, on the basis of the route information, a set temperature, a control start timing, or both as control information to be used for pre-air conditioning control for a vehicle compartment space of the vehicle. The control unit is configured to perform at least the pre-air conditioning control on the basis of the control information.

An aspect of the technology provides a vehicle control device including a control information determining unit and a control unit. The control information determining unit is configured to determine, on the basis of route information of an occupant to an expected boarding position where the occupant is to get in a vehicle, a set temperature, a control start timing, or both as control information to be used for pre-air conditioning control for a vehicle compartment space of the vehicle. The control unit is configured to perform at least the pre-air conditioning control on the basis of the control information.

An aspect of the technology provides a vehicle control system including circuitry. The circuitry is configured to identify an expected boarding position where an occupant is to get in a vehicle. The circuitry is further configured to acquire route information of the occupant to the expected boarding position. The circuitry is further configured to determine, on the basis of the route information, a set temperature, a control start timing, or both as control information to be used for pre-air conditioning control for a vehicle compartment space of the vehicle. The circuitry is further configured to perform at least the pre-air conditioning control on the basis of the control information.

An aspect of the technology provides a vehicle control device including circuitry. The circuitry is configured to determine, on the basis of route information of an occupant to an expected boarding position where the occupant is to get in a vehicle, a set temperature, a control start timing, or both as control information to be used for pre-air conditioning control for a vehicle compartment space of the vehicle. The circuitry is further configured to perform at least the pre-air conditioning control on the basis of the control information.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
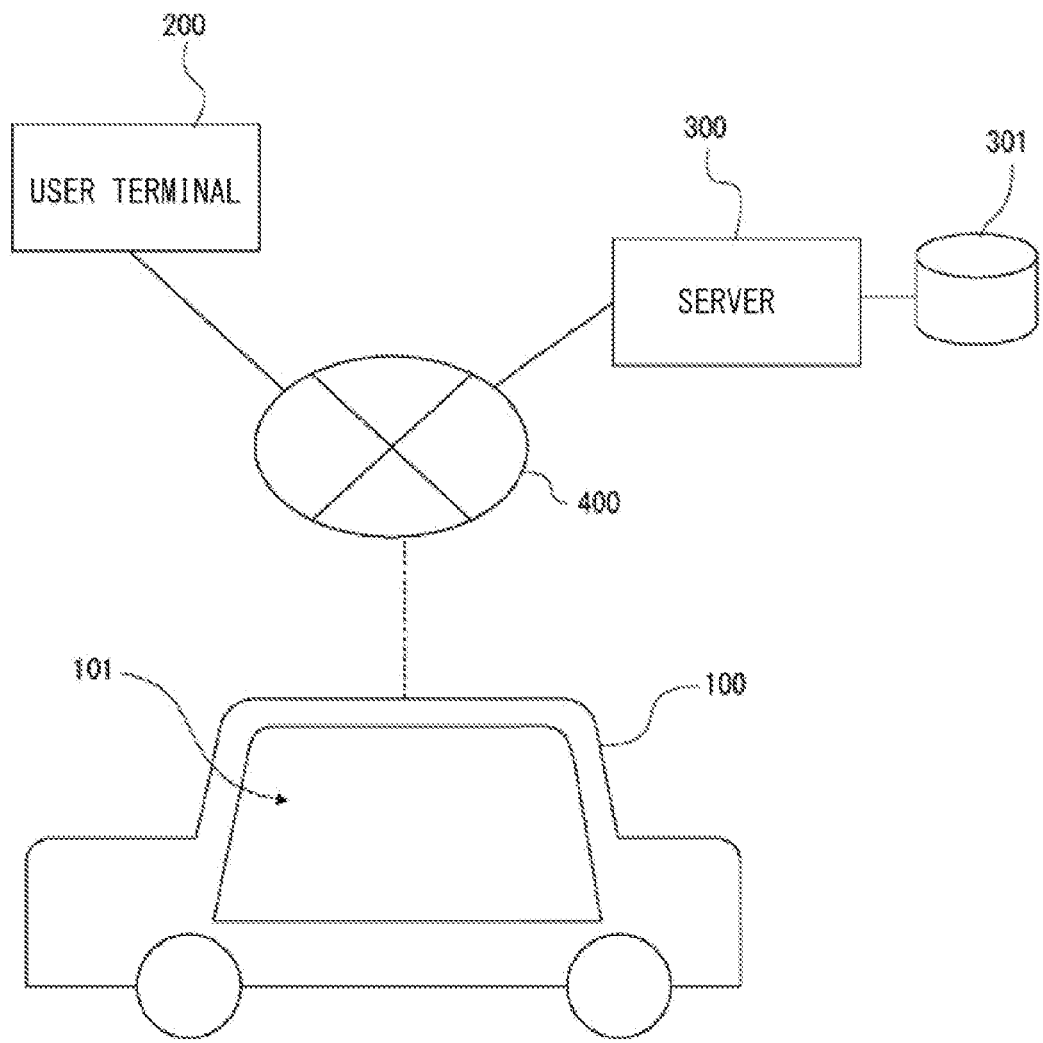
FIG. 1 is a diagram illustrating an overall configuration including a vehicle according to one example embodiment of the technology.

Only using the current position of the occupant and the position of the vehicle does not necessarily bring a temperature, for example, in the vehicle compartment at a time when the occupant gets in the vehicle into a state comfortable for the occupant.

It is desirable to perform pre-air conditioning control to bring an environment in a vehicle compartment at a time when an occupant gets in a vehicle into a state comfortable for the occupant.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

As an example embodiment of the technology, an overall configuration including a vehicle will be described with reference to the drawings.

FIG. 1 illustrates an overall configuration of a system that performs pre-air conditioning control for a vehicle 100. The system may include the vehicle 100, a user terminal 200, a server 300, and a communication network 400.

The vehicle 100, the user terminal 200, and the server 300 may be configured to perform data communication with each other via the communication network 400.

The vehicle 100 may have an internal space serving as a vehicle compartment space 101.

The user terminal 200 may be a terminal device, such as a mobile phone (e.g., a smartphone), a personal computer (PC), or a tablet device, used by an occupant (hereinafter referred to as "user") expected to ride in the vehicle 100.

For example, the user terminal 200 may be installed with dedicated application software (hereinafter, simply referred to as "dedicated application") configured to perform various types of control for the vehicle 100. Starting and using the dedicated application on the user terminal 200 enables the user to perform the various types of control of the vehicle 100. In the example embodiment, it is possible to execute the pre-air conditioning control as an example of the various types of control.

The dedicated application may be configured to execute a process of searching for a travel route from location A to location B. For example, it is possible to search for a travel route for travel from the current position of the user to the current position of the vehicle.

Different applications may be used for the control for the vehicle 100 and for the search for the travel route.

The server 300 may be a terminal device that executes a part of various processes by the dedicated application. The server 300 may include a PC, for example. The server 300 may be configured to execute a process of extracting a search result and transmitting the search result to the user terminal 200, for example, in response to a travel route search request from the dedicated application.

To execute such a process, the server 300 may include, for example, an application programming interface (API).

The server 300 may include a database (DB) 301 to be used for execution of various processes. The DB 301 may be, for example, a search DB to be used for the search process. In addition, information to be used for the various processes executed by the dedicated application may be stored in the DB 301.

The communication network 400 may have any configuration. For example, various networks such as a mobile phone network, a mobile communication network, a satellite communication network, the Internet, an intranet, or an extranet may be assumed as the communication network 400.

The vehicle 100 and the user terminal 200 may partly serve as a vehicle control system 1 that performs pre-air conditioning for the vehicle compartment space 101 of the vehicle 100.

A configuration of the vehicle 100 and a configuration of the user terminal 200 are described in detail below.

The vehicle 100 may include a part of the vehicle control system 1 that performs the pre-air conditioning control.

An example configuration of the vehicle 100 will be described with reference to FIG. 2. Although the following description gives the vehicle 100 serving as a hybrid electric vehicle (HEV) as an example, the vehicle 100 may serve as a gasoline vehicle that travels by using only an engine, or the vehicle 100 may serve as an electric vehicle that travels by using only a motor.

The vehicle 100 may include an HEV processor 2, an engine processor 3, a motor processor 4, a transmission processor 5, a steering control processor 6, a brake processor 7, a wireless communication processor 8, an air conditioning control processor 9, a pre-air conditioning control processor 10, sensors and operating devices 11, and a bus 12, for example.

The HEV processor 2, the engine processor 3, the motor processor 4, the transmission processor 5, the steering control processor 6, the brake processor 7, the air conditioning control processor 9, the pre-air conditioning control processor 10, and the wireless communication processor 8 may each include a microcomputer, and may be coupled to each other to be able to perform data communication via the bus 12. The microcomputer may include a central processing unit (CPU), a read only memory (ROM), and a random access memory (RAM), for example.

The HEV processor 2 may control operation of the vehicle by instructing the engine processor 3 and the motor processor 4, on the basis of requested driving force.

In one example, the HEV processor 2 may, on the basis of the requested driving force, calculate engine requested driving force that is driving force requested of an engine, and motor requested driving force that is driving force requested of a motor generator. The HEV processor 2 may issue a drive instruction based on the engine requested driving force to the engine processor 3, and issue a drive instruction based on the motor requested driving force to the motor processor 4.

The engine processor 3 may control various actuators provided as engine-related actuators, in response to the drive instruction from the HEV processor 2, i.e., on the basis of the engine requested driving force. The engine-related actuators may include, for example, various actuators related to drive of the engine, such as a throttle actuator that drives a throttle valve or an injector that injects fuel.

The engine processor 3 may control output of the engine by controlling fuel injection timing, a fuel injection pulse width, and a throttle position, for example, on the basis of the engine requested driving force. The engine processor 3 may also be configured to control start/stop of the engine.

The motor processor 4 may control operation of the motor generator by controlling a motor driver, in response to the drive instruction from the HEV processor 2, i.e., on the basis of the motor requested driving force. The motor driver may be configured as an electric circuit including a drive circuit of the motor generator.

On the basis of the motor requested driving force, the motor processor 4 may instruct the motor driver to rotate the motor generator for power running in a case where the motor generator is to be rotated for power running, and instruct the motor driver to rotate the motor generator for regeneration in a case where the motor generator is to be rotated for regeneration.

The motor processor 4 may monitor information such as a charging state, e.g., a state of charge (SOC), of a battery provided as a power source of the motor generator for travel of the vehicle 100. The motor processor 4 may, for example, limit output of the motor generator on the basis of the SOC.

The transmission processor 5 may control various actuators provided as transmission-related actuators, on the basis of a detection signal from a predetermined sensor provided in the vehicle 100 and operation input information inputted by an operating device.

The transmission-related actuators may include, for example, a speed change actuator that performs speed change control of an automatic transmission included in the vehicle 100 and a forward/reverse switching actuator that controls operation of a forward/reverse switch mechanism.

For example, the transmission processor 5 may perform the speed change control by outputting a speed change signal to the speed change actuator in accordance with a predetermined speed change pattern. The transmission processor 5 may also switch forward/reverse travel of the vehicle 100 by controlling the forward/reverse switching actuator on the basis of an instruction from a driver.

The steering control processor 6 may control a steering angle by controlling drive of a steering actuator on the basis of an operation performed by the driver with a steering wheel, for example. The steering actuator may be an actuator provided to enable the steering angle to be changed, such as a power steering motor.

The brake processor 7 may control various actuators provided as brake-related actuators, on the basis of a detection signal from a predetermined sensor provided in the vehicle 100 and operation input information inputted by an operating device.

The brake-related actuators may include, for example, various actuators related to braking, such as a fluid pressure control actuator that controls an output fluid pressure from a brake booster to a master cylinder or a fluid pressure in a brake fluid pipe.

The brake processor 7 may implement antilock brake system (ABS) control, by calculating a wheel slip ratio from detection information of a predetermined sensor, and increasing or reducing the fluid pressure on the basis of the slip ratio by the fluid pressure control actuator. The predetermined sensor may be, for example, an axle rotation speed sensor or a vehicle speed sensor.

The wireless communication processor 8 may communicate with the user terminal 200 and the server 300 via the communication network 400 including the Internet, for example. For example, the wireless communication processor 8 may receive, from the user terminal 200, a request related to the pre-air conditioning control, such as a request for execution of the pre-air conditioning control, or route information for the user to arrive at the vehicle 100. The route information may be information including at least a transportation mode (including walking, for example) used by the user and travel time. Note that the route information may include two or more sets of the transportation mode and the travel time.

The wireless communication processor 8 may also perform a transmission process of requesting, of the server 300, correction information to be used for calculation of an amount of activity of the user, and a process of receiving the correction information. The correction information will be described later.

The air conditioning control processor 9 may implement the air conditioning of the vehicle compartment space 101, by controlling a compressor that compresses air, an expansion valve, and an air-blowing fan, for example. For example, the compressor and the expansion valve may compress and expand a coolant, and thereby air may be cooled and heated on the basis of a vapor compression refrigeration cycle.

The air conditioning control processor 9 may drive the compressor, for example, in response to an operation performed on an operating device, to perform air conditioning control to bring a temperature of the vehicle compartment space 101 close to a set temperature (target temperature).

The pre-air conditioning control processor 10 may perform pre-air conditioning control of the vehicle compartment space 101, by outputting control information to the air conditioning control processor 9. The pre-air conditioning control may be air conditioning control that is performed from before the user gets in the vehicle 100. The pre-air conditioning control may be executed to provide the vehicle compartment space 101 that is comfortable when the user gets in the vehicle 100. In one embodiment, the pre-air conditioning control processor 10 may serve as a "vehicle control device".

The control information to be outputted by the pre-air conditioning control processor 10 to the air conditioning control processor 9 to perform the pre-air conditioning control may be, for example, information on the set temperature and information on start timing of the pre-air conditioning control.

The set temperature for the pre-air conditioning control may be appropriately set, which makes it possible to provide the vehicle compartment space 101 that is comfortable when the user gets in the vehicle 100.

The control start timing for the pre-air conditioning control may be appropriately set, which makes it possible to make the temperature of the vehicle compartment space 101 reach the set temperature before the user gets in the vehicle, and prevent gas mileage (or electric mileage) from being unnecessarily degraded by starting the pre-air conditioning control too early.

In the pre-air conditioning control processor 10, various units may be implemented by the CPU, the ROM, and the RAM, for example.

In one example, the pre-air conditioning control processor 10 may include, as the various units, an activity amount estimating unit 21, a control information determining unit 22, and an instructing unit 23.

The activity amount estimating unit 21 may perform a process of estimating an amount of activity before boarding of the user.

The amount of activity will now be described. The amount of activity may be an amount of exercise of the user. The amount of activity may also be referred to as a degree of fatigue of the user. The amount of activity may also be regarded as being related to an amount of perspiration of the user. The amount of activity may be regarded as being related to a body temperature or a sensible temperature of the user.

The amount of activity may change depending on by which transportation mode and along what route the user reaches an expected boarding position where the user is to get in the vehicle 100. The amount of activity may be corrected by using various types of correction information.

The correction information may be, for example, temperature, humidity, an amount of solar radiation, or an amount of baggage of the user. For example, the activity amount estimating unit 21 may correct the amount of activity in an increasing direction with an increase in the temperature, correct the amount of activity in the increasing direction with an increase in the humidity, correct the amount of activity in the increasing direction with an increase in the amount of solar radiation, and correct the amount of activity in the increasing direction with an increase in the amount of baggage.

These pieces of correction information are mere examples, and other various data may be used as the correction information. For example, data having an influence on the body temperature of the user or data having an influence on the amount of perspiration of the user may serve as the correction information usable for correction of the amount of activity.

Personal data of the user may be used as the correction information. For example, information such as age, height, or weight, or information such as sensitivity to heat or sensitivity to cold may be used as the correction information.

For example, the amount of activity may be corrected in the increasing direction with an increase in the weight. The amount of activity may be corrected in the increasing direction with an increase in the sensitivity to heat.

The control information determining unit 22 determines the control information to be used for the pre-air conditioning control. The control information to be used for the pre-air conditioning control may be the set temperature and the control start timing.

The control information determining unit 22 may determine the set temperature of the pre-air conditioning control on the basis of the amount of activity estimated by the activity amount estimating unit 21. In determining the set temperature of the pre-air conditioning control, the set temperature usually designated by the user in giving an instruction for the air conditioning of the vehicle compartment space 101, for example, may be factored in.

The control information determining unit 22 may estimate an expected boarding time in the vehicle 100 from the route information of the user, and determine the start timing of the pre-air conditioning control. In determining the start timing, for example, the current temperature of the vehicle compartment space 101 may be taken into consideration.

The expected boarding time may be a time at which the user is to arrive at the current position of the vehicle 100, or may be a time at which the user is to arrive at the expected boarding position designated by the user. For example, in a case where the vehicle 100 is a vehicle used in carsharing, the current location of the vehicle 100 may be a trip destination of another user currently using the vehicle. In that case, the expected boarding position may be a return location of the vehicle 100.

The control information determining unit 22 may not estimate the expected boarding time. For example, the route information received from the user terminal 200 may include information on the time of arrival at the current position of the vehicle 100 or the expected boarding position.

The control information determining unit 22 may determine only the set temperature as the control information to be used for the pre-air conditioning control, and immediately start the pre-air conditioning control without determining the control start timing.

In another example, the control information determining unit 22 may determine only the control start timing as the control information to be used for the pre-air conditioning control, and may not perform the process of determining the set temperature. Thus, for example, the pre-air conditioning control may be performed on the basis of the set temperature currently set for the vehicle 100.

The instructing unit 23 may instruct the air conditioning control processor 9 on the basis of the control information (the set temperature and/or the control start timing) determined by the control information determining unit 22. The air conditioning control processor 9 may perform air conditioning control on the basis of contents of the instruction. This enables pre-air conditioning to be implemented in the vehicle compartment space 101 of the vehicle 100. In one embodiment, the instructing unit 23 may serve as a "control unit".

The activity amount estimating unit 21, the control information determining unit 22, and the instructing unit 23 included in the pre-air conditioning control processor 10 may configure a part of the vehicle control system 1 that performs the pre-air conditioning control for the vehicle compartment space 101 of the vehicle 100.

The sensors and operating devices 11 may comprehensively represent various sensors and operating devices provided in the own vehicle. The sensors included in the sensors and operating devices 11 may include a vehicle speed sensor 11a that detects a speed of the own vehicle, an accelerator position sensor 11b that detects an accelerator position from an amount of depression of an accelerator pedal, a temperature sensor 11c that measures a temperature of the vehicle compartment space 101 or a temperature outside the vehicle, and a humidity sensor 11d that measures a humidity of the vehicle compartment space 101 or a humidity outside the vehicle, for example.

Values measured by the temperature sensor 11c and the humidity sensor 11d may be used in determining the set temperature and the control start timing for the pre-air conditioning control described above.

Although not illustrated, the sensors and operating devices 11 may also include, as other sensors, an engine speed sensor that detects an engine speed, an intake air amount sensor that detects an amount of intake air to the engine, a throttle position sensor that detects a position of a throttle valve that is provided in an intake passage to adjust an amount of intake air to be supplied to each cylinder of the engine, a water temperature sensor that detects a cooling water temperature indicating an engine temperature, and a gradient sensor that detects a gradient of the own vehicle traveling road, for example.

The operating devices may include, for example, a start switch to be used for giving an instruction for start/stop of the vehicle control system 1.

Figure 3:
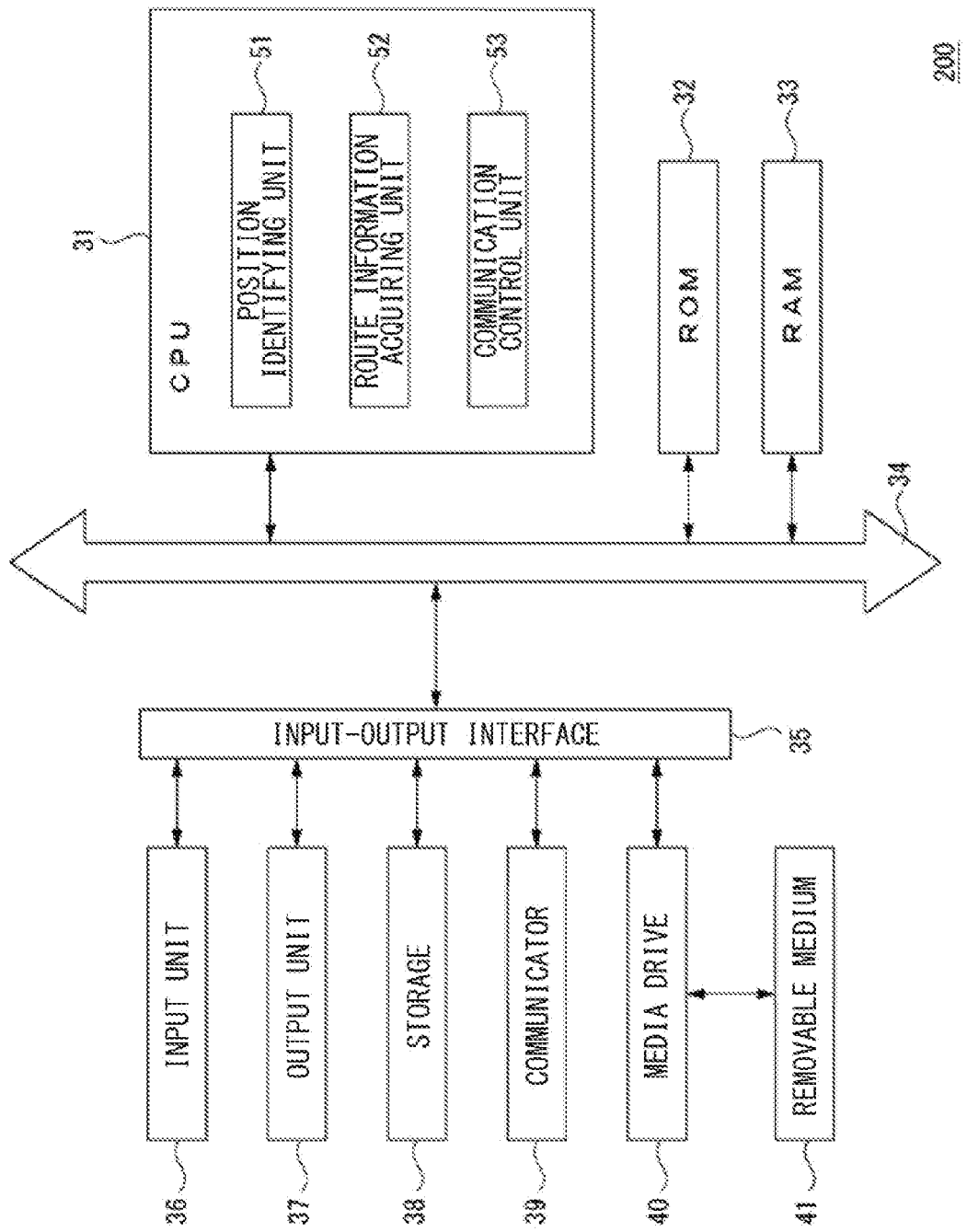
FIG. 3 is a diagram illustrating an example configuration of a user terminal.

FIG. 3 illustrates an example configuration of the user terminal 200 according to the example embodiment.

The user terminal 200 may include a CPU 31, a ROM 32, a RAM 33, a bus 34, an input-output interface 35, an input unit 36, an output unit 37, a storage 38, a communicator 39, and a media drive 40, for example.

The CPU 31 may execute various processes in accordance with a program stored in the ROM 32, or a program loaded in the RAM 33 from the storage 38. The RAM 33 may also store, as appropriate, data to be used for the CPU 31 to execute the various processes.

The CPU 31, the ROM 32, and the RAM 33 may be coupled to each other via the bus 34. The input-output interface 35 may also be coupled to the bus 34.

The input unit 36, the output unit 37, the storage 38, the communicator 39, and the media drive 40 may be coupled to the input-output interface 35.

The input unit 36 may include a keyboard, a mouse, a touch panel, and a microphone, for example.

The output unit 37 may include a display and a speaker, for example. The display may include a liquid crystal display (LCD), a cathode ray tube (CRT), or an organic electroluminescence (EL) panel.

The storage 38 may include a hard disk drive (HDD) and a flash memory, for example.

The communicator 39 may perform communication processing and inter-device communication via the communication network 400.

The media drive 40 may be mounted, on an as-needed basis, with a removable medium 41 such as a magnetic disk, an optical disk, a magneto-optical disk, or a semiconductor memory, and information may be written to and read from the removable medium 41.

The user terminal 200 may upload and download data and programs by the communication performed by the communicator 39. Data and programs may also be exchanged via the removable medium 41.

Information processing and communication to be performed by the user terminal 200 may be executed by the CPU 31 performing processing operation on the basis of various programs.

In the user terminal 200, various units may be implemented by the CPU 31, the ROM 32, and the RAM 33, for example.

In one example, the user terminal 200 may include a position identifying unit 51, a route information acquiring unit 52, and a communication control unit 53.

The position identifying unit 51 performs a process of identifying the position where the user is to get in the vehicle 100, i.e., the expected boarding position. For example, a process of acquiring the expected boarding position inputted by the user in the dedicated application installed on the user terminal 200 may be executed as the identification process.

In another example, the current position information of the vehicle 100 received from the vehicle 100 may be identified as the expected boarding position.

The position identifying unit 51 may also identify a travel start position of the user expected to ride in the vehicle 100. For example, the user terminal 200 may acquire the current position information of the user terminal 200 by using a global navigation satellite system (GNSS), and the current position information may be identified as the travel start position.

In another example, position information inputted by the user may be identified as the travel start position.

The route information acquiring unit 52 may acquire, by searching, the route information between the travel start position and the expected boarding position identified by the position identifying unit 51. The search process may be executed by, for example, the server 300.

The route information serving as the acquired search result may be displayed on a display, for example, included in the user terminal 200 to be presented to the user.

The route information acquiring unit 52 may acquire two or more pieces of route information. In that case, one piece of route information may be selected by the user from the two or more pieces of route information, or one piece of route information may be automatically selected from the two or more pieces of route information to make the expected time of arrival at the expected boarding position earliest. As other examples, the cheapest route for travel to the expected boarding position may be automatically selected. A route may be automatically selected to enable the user to stay out of the rain as much as possible in rainy weather, for example.

Figure 4:
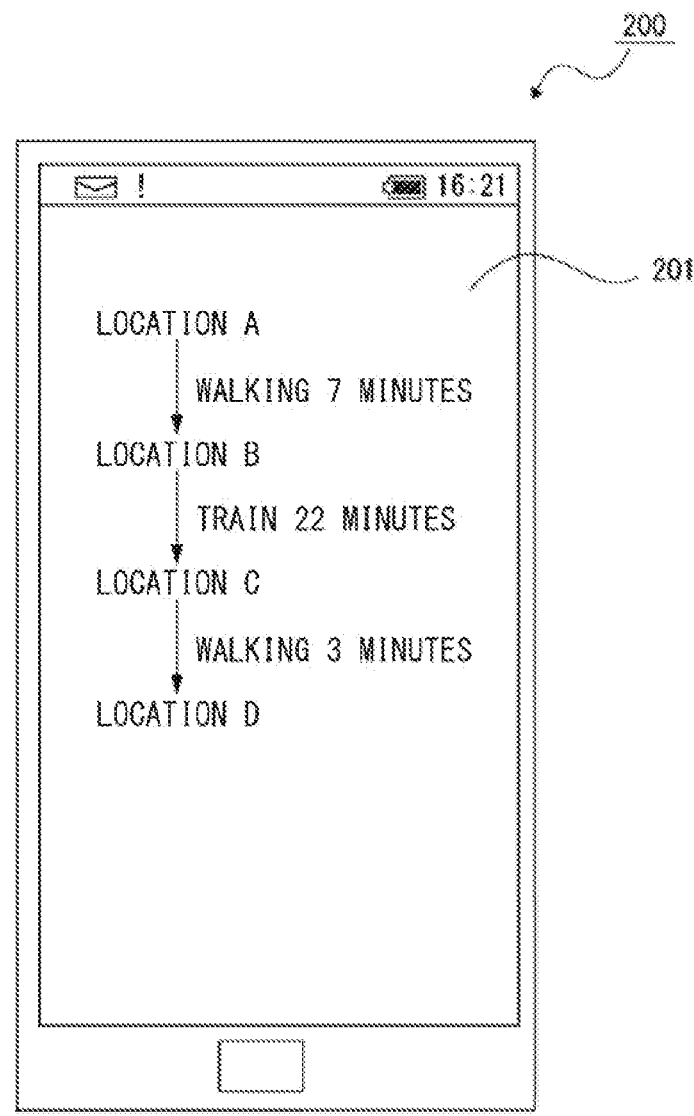
FIG. 4 is a diagram illustrating an example of route information to be presented to a user who is expected to ride in the vehicle.

FIG. 4 illustrates an example of the route information to be presented to the user.

FIG. 4 illustrates a state in which route information from location A serving as the travel start position to location D serving as the expected boarding position is presented on a screen 201 of the user terminal 200.

The route information illustrated in FIG. 4 may include two or more sets of the transportation mode and the travel time. In one example, it may take 7 minutes by walking from location A to location B, 22 minutes by train from location B to location C, and 3 minutes by walking from location C to location D. The "walking" and "train" may indicate the transportation mode, and the "7 minutes" and "22 minutes" may indicate the travel time.

The route information to be presented to the user may include information on expense for travel (train fare in FIG. 4).

Description will be given returning to FIG. 3.

The communication control unit 53 may transmit a route search request to the server 300, transmitting information on the travel start position and the expected boarding position. The communication control unit 53 may receive a route search result from the server 300.

The communication control unit 53 may also perform a process of transmitting the route information selected by the user or the automatically selected route information to the vehicle 100. The route information to be transmitted may include a set of the transportation mode and the travel time. The route information to be transmitted may also include the expected time of arrival at the expected boarding position.

To the vehicle 100, the expected arrival time inputted by the user may be transmitted, or the expected arrival time based on the assumption that the user starts travel at the current time may be automatically calculated and transmitted.

In a case where the route information does not include the expected arrival time, it may be assumed that the user starts travel at the time of transmission of the route information. In the example of FIG. 4, the user may be assumed to arrive at the expected boarding position 32 minutes after the time of transmission of the route information. Such assumption may be made by the user terminal 200, or may be made by any of the processors of the vehicle 100.

The position identifying unit 51, the route information acquiring unit 52, and the communication control unit 53 implemented by the CPU, the ROM, and the RAM, for example, of the user terminal 200 may configure a part of the vehicle control system 1 that performs the pre-air conditioning control for the vehicle compartment space 101 of the vehicle 100.

Description will be given on a first example embodiment of a process to be executed by the activity amount estimating unit 21, the control information determining unit 22, and the instructing unit 23 implemented by the pre-air conditioning control processor 10 of the vehicle 100.

In the first example embodiment, the activity amount estimating unit 21 may estimate the amount of activity before boarding of the user on the basis of the received route information. The control information determining unit 22 may determine the set temperature on the basis of the estimated amount of activity, and determine the control start timing on the basis of the expected arrival time.

Figure 5:
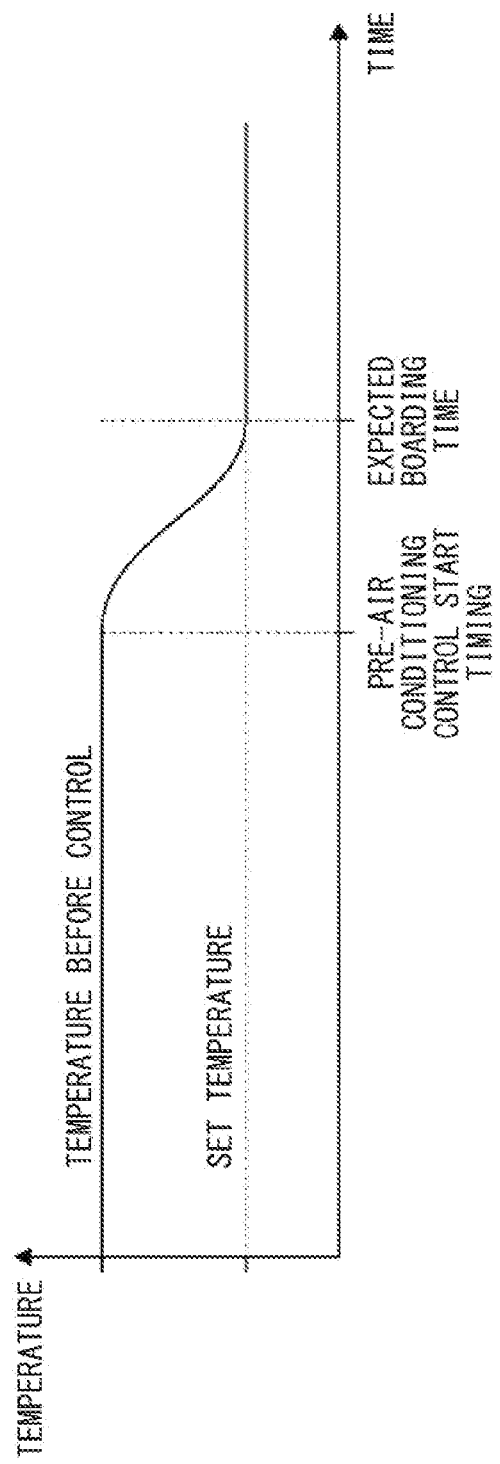
FIG. 5 is a diagram illustrating an example of optimum pre-air conditioning control.

FIG. 5 illustrates an example of ideal pre-air conditioning control. In terms of electric power consumption, for example, it is desired that a time length from the pre-air conditioning control start timing to the expected boarding time be short.

In terms of the user's comfort when getting in the vehicle, it is desired that the set temperature be attained by the expected boarding time.

Accordingly, as illustrated in FIG. 5, the pre-air conditioning control may be performed to attain the set temperature right at the expected boarding time, for example.

The pre-air conditioning control start timing may vary depending on the current temperature (temperature before the control), the set temperature, and the expected boarding time, for example.

Description will now be given on a process to be executed by the pre-air conditioning control processor 10 of the vehicle 100 to determine the optimum pre-air conditioning control start timing. Note that a series of processes illustrated in FIG. 6 may be an example of a process to be executed by the pre-air conditioning control processor 10 of the vehicle 100 that has received a pre-air conditioning control start request from the user terminal 200. This process may be referred to as a pre-air conditioning control start request reception process.

The pre-air conditioning control processor 10 may, in step S101, acquire the transportation mode and the travel time serving as the route information. The information may be two or more sets of the transportation mode and the travel time.

The route information may be received from the user terminal 200 together with receiving of the pre-air conditioning control start request. In another example, in executing the process in step S101, the pre-air conditioning control processor 10 may prompt the user terminal 200 to transmit the route information by transmitting a transmission request to the user terminal 200.

The pre-air conditioning control processor 10 may, in step S102, acquire the time at which the user is expected to arrive at the expected boarding position (expected arrival time). As with the route information, the information on the expected arrival time may be received from the user terminal 200 at various timings.

Figures 7, 8:
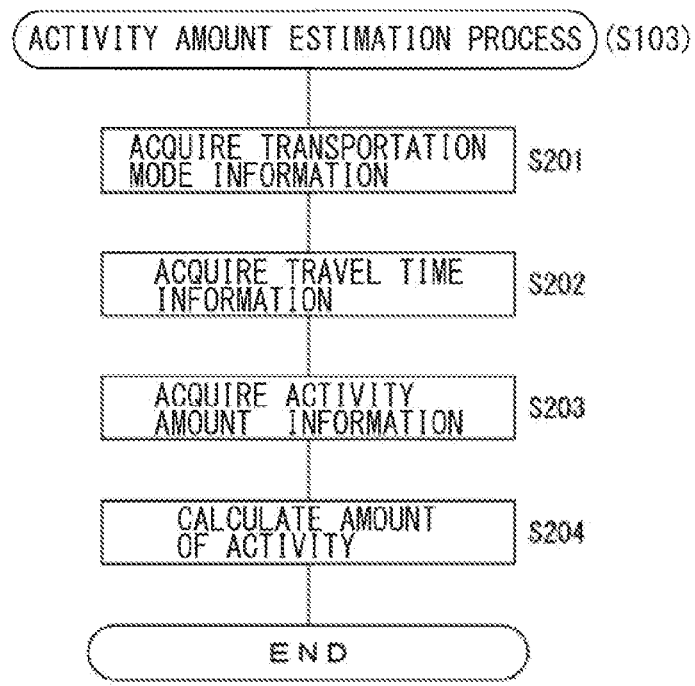
FIG. 7 is a flowchart illustrating an example of an activity amount estimation process according to one example embodiment.
FIG. 8 is a diagram illustrating an example of activity amount information.

The pre-air conditioning control processor 10 may execute an activity amount estimation process in step S103. The activity amount estimation process may be a process of estimating the amount of activity of the user before arriving at the expected boarding position. There may be various examples of the activity amount estimation process. FIG. 7 illustrates an example.

The pre-air conditioning control processor 10 may acquire transportation mode information in step S201 of the activity amount estimation process. In the example illustrated in FIG. 4, the transportation mode information may be "walking", "train", and "walking".

The pre-air conditioning control processor 10 may acquire travel time information in step S202. In the example illustrated in FIG. 4, the travel time information may be "7 minutes", "22 minutes", and "3 minutes". Each piece of the travel time information may be information associated with the corresponding transportation mode.

The pre-air conditioning control processor 10 may, in step S203, acquire activity amount information for each transportation mode. The activity amount information to be acquired may be information to be used for calculation (estimation) of the amount of activity. FIG. 8 illustrates an example of the activity amount information.

The activity amount information may be information on the amount of activity (e.g., amount of activity per unit time) for each transportation mode.

Description will be given using the example of the travel route information illustrated in FIG. 4. The pre-air conditioning control processor 10 may acquire, as the activity amount information, information on the amount of activity per unit time associated with "walking (normal)" and "train".

Such activity amount information may be stored in the ROM 32, the RAM 33, or the storage 38 of the user terminal 200, or may be stored in the DB 301 of the server 300.

Thereafter, the pre-air conditioning control processor 10 may calculate the amount of activity in step S204. In one example, individual amounts of activity for the respective transportation modes may be calculated first, and then an ultimate amount of activity may be calculated on the basis of such information.

An example will be described with reference to FIG. 4. For example, the individual amount of activity related to the travel from location A to location B may be calculated by using information on the travel time (7 minutes) taken for the travel from location A to location B and the amount of activity per unit time associated with "walking (normal)" serving as the transportation mode.

Similarly, the individual amount of activity related to the travel from location B to location C may be calculated by using information on the travel time (22 minutes) taken for the travel from location B to location C and the amount of activity per unit time associated with "train" serving as the transportation mode.

The individual amount of activity related to the travel from location C to location D may be calculated by using information on the travel time (3 minutes) taken for the travel from location C to location D and the amount of activity per unit time associated with "walking (normal)" serving as the transportation mode.

Thereafter, the calculated three individual amounts of activity for the respective transportation modes may be used to calculate the ultimate amount of activity. Various methods may be used to calculate the amount of activity by using the three individual amounts of activity.

For example, the amount of activity of the user before traveling to the expected boarding position may be calculated by simply adding up the three individual amounts of activity for the respective transportation modes.

In another example, the three individual amounts of activity for the respective transportation modes may be multiplied by a coefficient to be weighted and thereafter the individual amounts of activity may be added up. Thus, for example, the transportation mode used at a later timing may be made to have a larger influence on the amount of activity.

In another example, the individual amount of activity for each transportation mode may be multiplied by a coefficient based on elapsed time from the end of use of the transportation mode to the expected boarding time, and thereafter the individual amounts of activity may be added up. This technique makes it possible to take into consideration how much influence of the individual amount of activity for each transportation mode remains, as fatigue, for example, in the user who has traveled to the expected boarding position.

The ultimate amount of activity may be calculated on the basis of only the individual amount of activity for the transportation mode to be last used. For example, in the example illustrated in FIG. 4, it may be assumed that the individual amount of activity (walking) resulting from the travel from location A to location B has no influence as a result of using train from location B to location C.

In such a case, by calculating the ultimate amount of activity on the basis of only the individual amount of activity for the transportation mode to be last used, it is possible to appropriately calculate the amount of activity at a time when the user arrives at the expected boarding position. Furthermore, in that case, it is possible to calculate the ultimate amount of activity without calculating the individual amounts of activity.

Two or more types may be provided for walking serving as the transportation mode as illustrated in FIG. 8. For example, "walking (slow)" in a case of walking slowly, "walking (normal)" in a case of walking at a normal walking speed, and "walking (fast)" in a case of walking fast may be provided. In this case, the amount of activity per unit time may be made to increase in the order of "walking (slow)", "walking (normal)", and "walking (fast)". The activity amount information about walking may be information per distance instead of information per time.

Furthermore, "running", for example, may be provided in addition to walking.

Such information on walking speed may actually be calculated from a walking speed of the user, or may be calculated from a usual walking speed, for example. Alternatively, a walking speed, for example, set in the application that performs a route search may be used.

Figure 6:
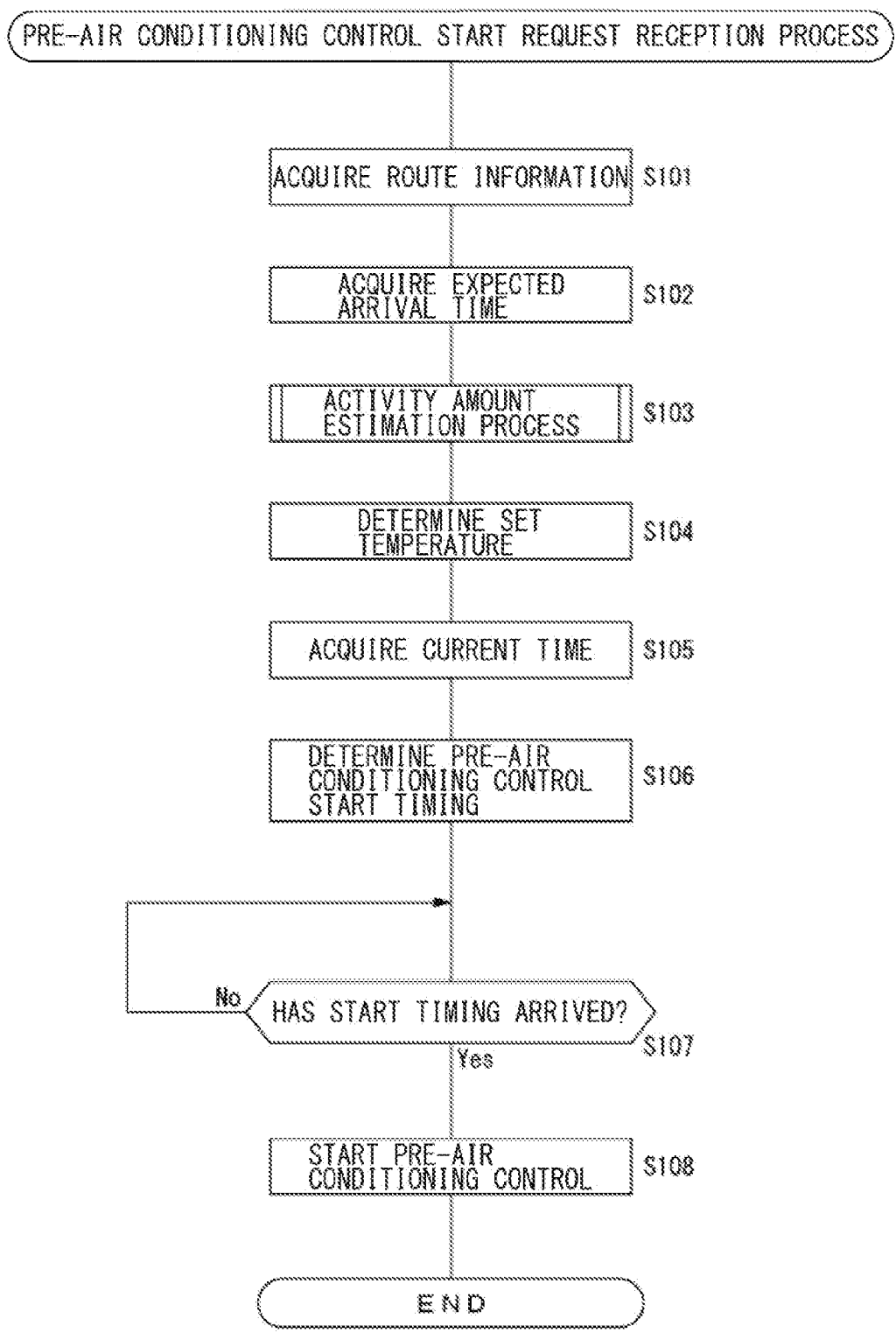
FIG. 6 is a flowchart illustrating an example of a pre-air conditioning control start request reception process according to one example embodiment.

The pre-air conditioning control processor 10 of the vehicle 100 may, after completion of the activity amount estimation process illustrated in FIG. 7, return to step S104 in FIG. 6 to determine the set temperature. In the process of determining the set temperature, the set temperature may be made lower as the amount of activity of the user who is expected to ride in the vehicle, calculated in step S103, is larger. This may apply no matter whether the pre-air conditioning control is heating or cooling.

The pre-air conditioning control processor 10 may acquire the current time in step S105. This process may be executed to determine the start timing of the pre-air conditioning control.

The pre-air conditioning control processor 10 may determine the pre-air conditioning control start timing in step S106. The start timing of the pre-air conditioning control may be determined on the basis of the current time acquired in step S105, the set temperature determined in step S104, and the expected arrival time acquired in step S102. The start timing of the pre-air conditioning control may be determined further on the basis of the current temperature of the vehicle compartment space 101. For example, the start timing may be made earlier as a difference between the set temperature and the current temperature is larger.

The set temperature and the start timing serving as the control information to be used for the pre-air conditioning control may be determined by the pre-air conditioning control processor 10 executing step S104 and step S106.

Thereafter, the pre-air conditioning control processor 10 may execute the pre-air conditioning control on the basis of the start timing of the pre-air conditioning control. In one example, the pre-air conditioning control processor 10 may determine whether the start timing has arrived in step S107. This process may be executed until the start timing arrives. Alternatively, the process in step S107 may be executed until a request for cancellation of the pre-air conditioning control is received from the user terminal 200.

Upon determining that the start timing of the pre-air conditioning control has arrived (Yes in step S107), the pre-air conditioning control processor 10 may, in step S108, cause the pre-air conditioning control to be started. In one example, the pre-air conditioning control processor 10 may transmit an air conditioning control start trigger together with information on the set temperature to the air conditioning control processor 9. Thus, the air conditioning control processor 9 may cause the air conditioning control of the vehicle compartment space 101 to be started.

Executing the pre-air conditioning control start request reception process according to the first example embodiment enables the pre-air conditioning control processor 10 to perform uniform pre-air conditioning control regardless of the user who is expected to ride in the vehicle, which reduces processing load. Because it is unnecessary to perform different processes for each user, it is possible to use a simple program for the pre-air conditioning control, which makes it easier to create a program unlikely to have bugs.

In a second example embodiment, correction information may be used in calculating the amount of activity. The correction information may be information about a factor that is likely to have an influence on the amount of activity. For example, an uncorrected amount of activity may be calculated first from the individual amounts of activity for the respective transportation modes, without using the correction information, and then a corrected amount of activity may be calculated from the uncorrected amount of activity by performing calculation using a coefficient, for example, obtained from the correction information.

In the following description, the uncorrected amount of activity may be referred to as a "basic amount of activity", and the corrected amount of activity may be simply referred to as an "amount of activity".

Figure 9:
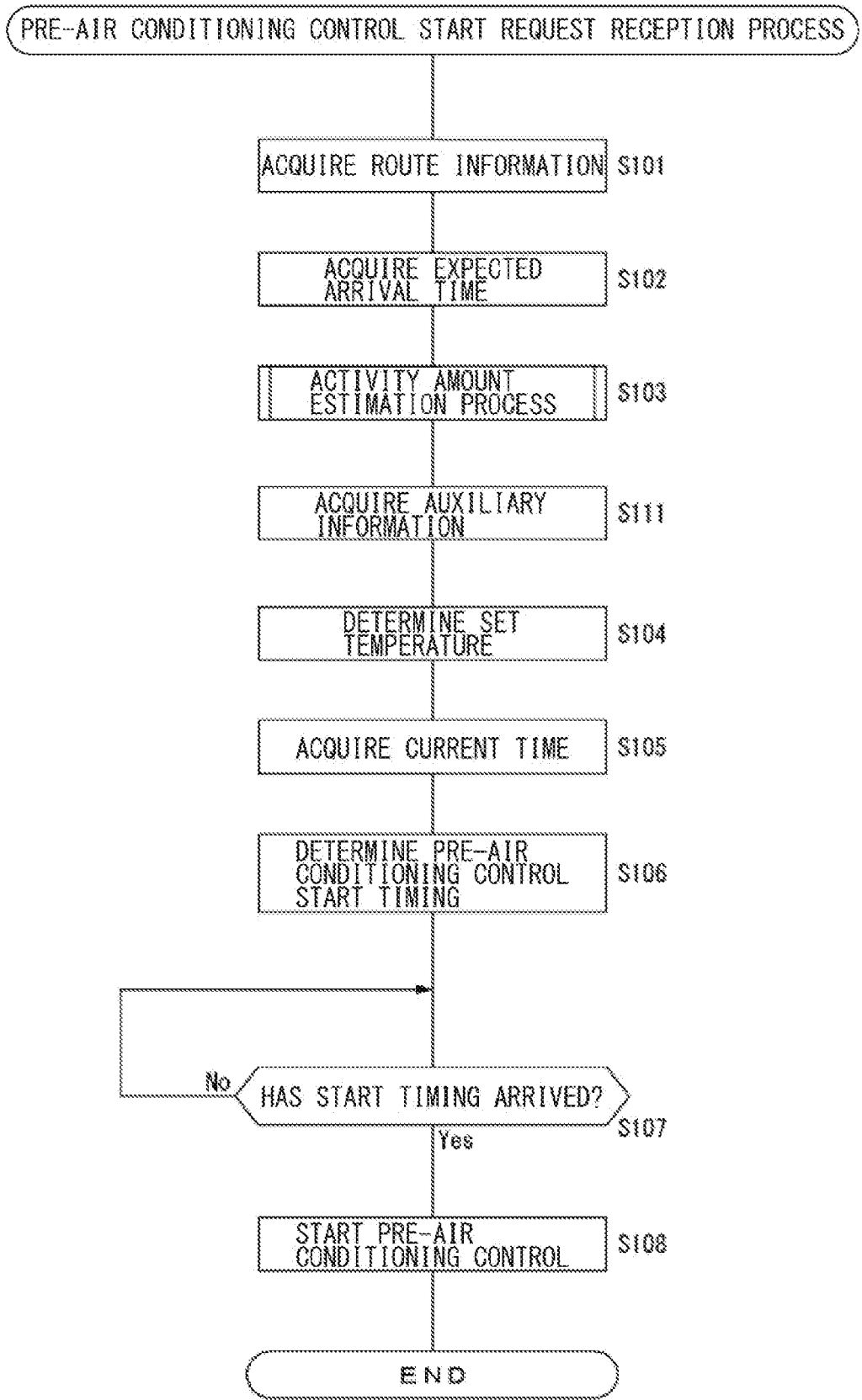
FIG. 9 is a flowchart illustrating an example of a pre-air conditioning control start request reception process according to one example embodiment.

FIG. 9 illustrates an example of a process to be executed by the pre-air conditioning control processor 10 in the second example embodiment. Note that processes that are similar to those described in the pre-air conditioning control start request reception process according to the first example embodiment and illustrated in FIG. 6 may be denoted with the same numerals to omit description as appropriate.

The pre-air conditioning control processor 10 may acquire the route information in step S101, and acquire the expected arrival time in step S102.

Thereafter, the pre-air conditioning control processor 10 may perform an activity amount estimation process in step S103.

Figure 10:
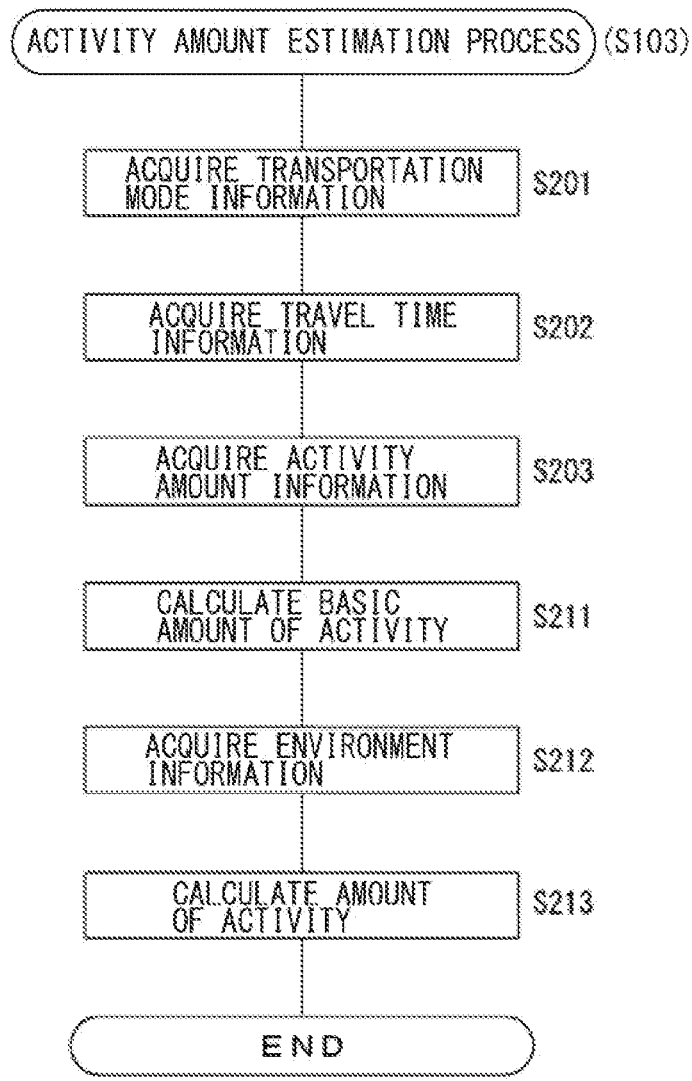
FIG. 10 is a flowchart illustrating an example of an activity amount estimation process according to one example embodiment.

An example of the activity amount estimation process according to the example embodiment will be described with reference to FIG. 10.

The activity amount estimation process may be a process of calculating the amount of activity before boarding of the user expected to ride in the vehicle 100. In the example embodiment, the activity amount estimation process may be a process of calculating the amount of activity by using environment information that is an example of the correction information.

In one example, the pre-air conditioning control processor 10 may acquire the transportation mode information in step S201. In the example of FIG. 4, the transportation mode information may be "walking", "train", and "walking".

Thereafter, the pre-air conditioning control processor 10 may, in step S202, acquire the travel time information for each transportation mode. In the example of FIG. 4, the travel time information may be "7 minutes", "22 minutes", and "3 minutes".

Thereafter, the pre-air conditioning control processor 10 may acquire the activity amount information in step S203. The activity amount information may be information illustrated in FIG. 8, and may be used for calculation of the amount of activity for each transportation mode.

The pre-air conditioning control processor 10 may calculate the basic amount of activity in step S211. The basic amount of activity may be the amount of activity calculated before using the environment information, i.e., the uncorrected amount of activity. The process in step S211 may be similar in contents to the process in step S204 of FIG. 7.

Thereafter, the pre-air conditioning control processor 10 may perform a process of correcting the basic amount of activity.

First, the pre-air conditioning control processor 10 may, in step S212, acquire the environment information as the correction information to be used for the correction process.

The environment information may be information having an influence on the amount of activity of the user. For example, the environment information may be information such as temperature, humidity, an amount of solar radiation, or wind speed.

The pre-air conditioning control processor 10 may, in step S213, calculate the amount of activity by performing the process of correcting the basic amount of activity. For example, in a case of calculating the amount of activity by multiplying the basic amount of activity by a coefficient, the coefficient may be increased with an increase in the temperature. The coefficient may be increased with an increase in the humidity. The coefficient may be increased with an increase in the amount of solar radiation. The coefficient may be reduced with an increase in the wind speed.

Information on an effect of such conditions on the user may be used as the environment information. In one example, the actually measured body temperature information of the user may be received as the environment information, and the coefficient may be calculated accordingly.

Thus correcting the basic amount of activity makes it possible to appropriately calculate the amount of activity of the user, which helps to appropriately set the set temperature for the vehicle compartment space 101.

Thereafter, the pre-air conditioning control processor 10 may determine the set temperature by using the calculated (estimated) amount of activity. In the example embodiment, auxiliary information may be used to set the set temperature.

In one example, the pre-air conditioning control processor 10 may acquire the auxiliary information in step S111 of FIG. 9. The auxiliary information to be acquired may be information on the previous set temperature of the air conditioning control for the vehicle compartment space 101, or information such as a set temperature preferred by the user.

The information on the previous set temperature may be the set temperature in the last-performed pre-air conditioning control, or may be the set temperature in the last-performed normal air conditioning control. In another example, the information may be a temperature that is set frequently. Such set temperatures may be those in a case where weather conditions are similar to the present case.

The temperature preferred by the user may be a temperature preferred by an owner of the vehicle 100, or may be a temperature preferred by the user expected to ride in the vehicle 100 (i.e., the user whose amount of activity is to be calculated). Alternatively, age and sex, for example, may be acquired as user information, and a temperature preferred by a similar user may be used as the set temperature.

The auxiliary information may be stored in, for example, the DB 301 of the server 300.

The pre-air conditioning control processor 10 may determine the set temperature in step S104. In this determination process, the amount of activity of the user estimated in step S103 and the auxiliary information acquired in step S111 may be used. Determining the set temperature by using the auxiliary information, for example, makes it possible to set the set temperature appropriate for the user.

The pre-air conditioning control processor 10 may acquire the current time in step S105, and determine the start timing of the pre-air conditioning control in step S106.

The pre-air conditioning control processor 10 may determine whether the start timing of the pre-air conditioning control has arrived in step S107, and cause the pre-air conditioning control to be started in step S108 upon determining that the start timing has arrived (Yes in step S107).

Description will now be given on a case of using, as the correction information, information other than the environment information (e.g., temperature) described above in the activity amount estimation process according to the second example embodiment. The correction information other than the environment information may be, for example, information about the user.

Figure 11:
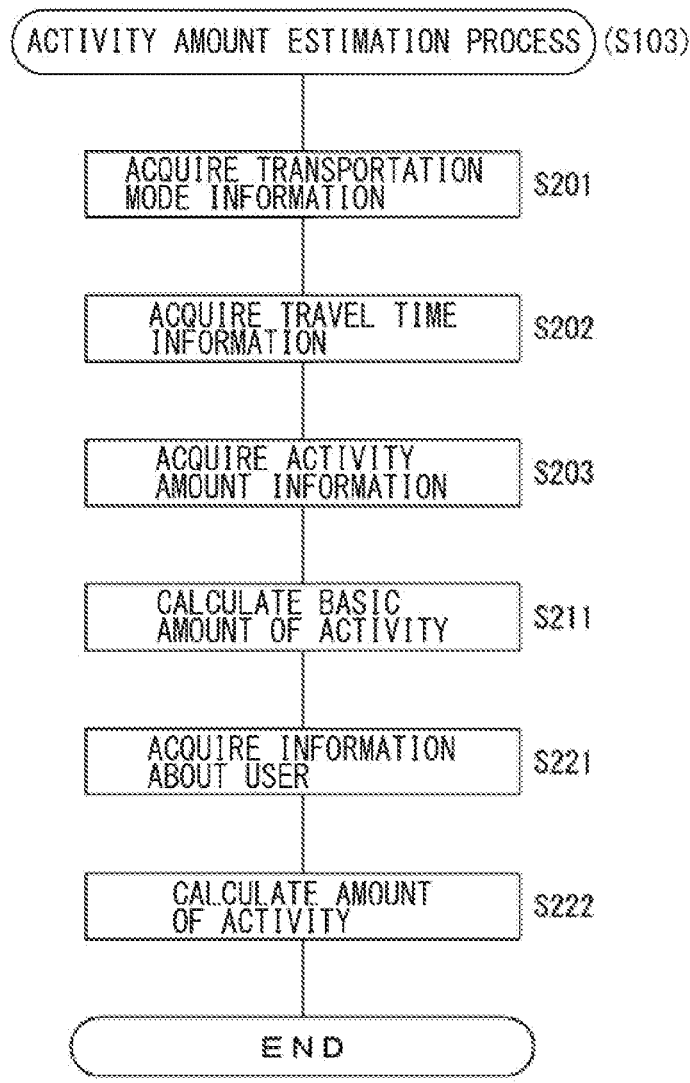
FIG. 11 is a flowchart illustrating another example of the activity amount estimation process according to one example embodiment.

With reference to FIG. 11, detailed description will be given on an example of using information about the user as the correction information to be used for correction of the amount of activity. Note that processes to be performed by the pre-air conditioning control processor 10 before executing the activity amount estimation process may be the processes in step S101 and step S102 illustrated in FIG. 9, and description thereof will be omitted.

In the activity amount estimation process, the pre-air conditioning control processor 10 may acquire the transportation mode information in step S201, and acquire the travel time information in step S202. These processes may be similar to those described above.

Thereafter, the pre-air conditioning control processor 10 may acquire the activity amount information (e.g., see FIG. 8) in step S203.

The pre-air conditioning control processor 10 may calculate the basic amount of activity by using the individual amounts of activity in step S211. Description on the processes in step S203 and step S211 will also be omitted to avoid any redundant description.

The pre-air conditioning control processor 10 may, in step S221, acquire information about the user. The information about the user may be, for example, baggage information or information about a physical condition of the user who is expected to ride in the vehicle. The information about the user may be information such as age, height, or weight, or may be information indicating whether the user is sensitive to heat or sensitive to cold.

The baggage information that is an example of the information about the user will be described in detail.

The baggage information may be information such as an amount of baggage (size or weight) of the user who is expected to ride in the vehicle. For example, the baggage information may be information to be acquired on the assumption that the amount of activity per unit time is larger as the baggage of the user is heavier even for the same transportation mode (e.g., walking).

The baggage information of the user may be estimated from, for example, information of a payment application installed on the user terminal 200. For example, in a case where a purchase price is paid using electronic money by reading of a two-dimensional code, a purchased product may be identified from information of the payment application.

In another example, the baggage information may be estimated from information of a shopping application.

The process of estimating the baggage information from the information of the application may be performed by the user terminal 200, or may be executed by the pre-air conditioning control processor 10 of the vehicle 100 that has received the information of the application from the user terminal 200. In either case, the pre-air conditioning control processor 10 may be configured to acquire the baggage information of the user.

Weight information may be acquired in place of the baggage information. For example, assume a case where the user terminal 200 includes an inertial measurement unit (IMU). The amount (weight) of baggage of the user may be estimated by acquiring IMU data obtained from the user walking with the user terminal 200, and analyzing the data. Such an estimation process may be implemented by performing, for example, machine learning using walk data about the user him/herself or another user.

After acquiring such information about the user, the pre-air conditioning control processor 10 may calculate (estimate) the amount of activity in step S222.

In calculating the amount of activity, the basic amount of activity calculated in step S211 may be corrected.

For example, in a case of calculating the amount of activity by multiplying the basic amount of activity by a coefficient, the coefficient may be increased with an increase in the weight. The coefficient may be increased with an increase in the sensitivity to heat. The coefficient may be increased with an increase in the age, or the coefficient may be increased with a decrease in the age. The coefficient may be increased only for a user of a specific age bracket.

Figure 12:
FIG. 12 is an explanatory diagram illustrating an example of baggage information that is information about an occupant.

In a case of calculating the coefficient on the basis of the baggage information of the user, for example, information illustrated in FIG. 12 may be used. In one example, the information illustrated in FIG. 12 may be weight information associated with each baggage category. Such information may be stored in the DB 301, or may be stored in the user terminal 200. Alternatively, such information may be stored in a storage of the vehicle 100.

The weight information may be, for example, simple information such as an average weight for each baggage category, or may be relatively accurate information calculated from a model number, for example, of a product.

The pre-air conditioning control processor 10 may acquire the weight information corresponding to the baggage information of the user from the DB 301, for example, and calculate the coefficient corresponding to the weight information.

FIG. 12 merely illustrates an example. For example, the coefficient itself by which the basic amount of activity is to be multiplied may be stored in association with each baggage category.

As other examples, information on whether the user has just had a meal or information on elapsed time from mealtime may be acquired as the information about the user. The information on whether the user has just had a meal or the information on the elapsed time from mealtime may be estimated on the basis of time information, for example, or may be estimated from information of the payment application used by the user in eating out.

In this manner, the pre-air conditioning control processor 10 may, in step S222, acquire (or calculate) the coefficient by which the basic amount of activity is to be multiplied.

The pre-air conditioning control processor 10 may use the acquired coefficient to calculate (estimate) the ultimate amount of activity from the basic amount of activity.

Thus correcting the basic amount of activity makes it possible to appropriately calculate the amount of activity on the basis of the information about the user, which helps to appropriately set the set temperature for the vehicle compartment space 101.

In the example described above, the amount of activity may be calculated by correcting the basic amount of activity by factoring in the correction information (the environment information or the information about the user) after calculating the basic amount of activity from the individual amounts of activity. Alternatively, the correction information may be factored in in calculating the individual amounts of activity. For example, the ultimate amount of activity may be calculated after calculating the individual amounts of activity factoring in the correction information on the basis of the individual amounts of activity for the respective transportation modes and the correction information.

For example, in regard to correction based on the baggage information, the individual amount of activity may be calculated by correcting the basic amount of activity on the basis of the correction information in a case of walking, and the individual amount of activity may be calculated without correcting the basic amount of activity on the basis of the correction information in a case of train. This may be based on consideration of a case of placing the baggage on an overhead rack, for example, when traveling by train. For example, it may be assumed that the baggage has no influence on the individual amount of activity of the user if the baggage is placed.

Described above is an example in which the vehicle control system 1 includes the position identifying unit 51, the route information acquiring unit 52, and the communication control unit 53 provided in the CPU 31 of the user terminal 200, and the activity amount estimating unit 21, the control information determining unit 22, and the instructing unit 23 provided in the pre-air conditioning control processor 10 of the vehicle 100. In other words, described above is an example in which the user terminal 200 transmits, to the pre-air conditioning control processor 10 of the vehicle 100, information to be used to determine the control information (the set temperature and the control start timing) for the pre-air conditioning control, and the pre-air conditioning control processor 10 of the vehicle 100 uses the acquired various types of information to determine the control information for the pre-air conditioning control and give an instruction for the pre-air conditioning control.

In another example, the user terminal 200 may determine the control information for the pre-air conditioning control. For example, the vehicle control system 1 may include the position identifying unit 51, the route information acquiring unit 52, the activity amount estimating unit 21, the control information determining unit 22, and the instructing unit 23 (or the communication control unit 53 that transmits the pre-air conditioning control start request) provided in the CPU 31 of the user terminal 200.

Figure 13:
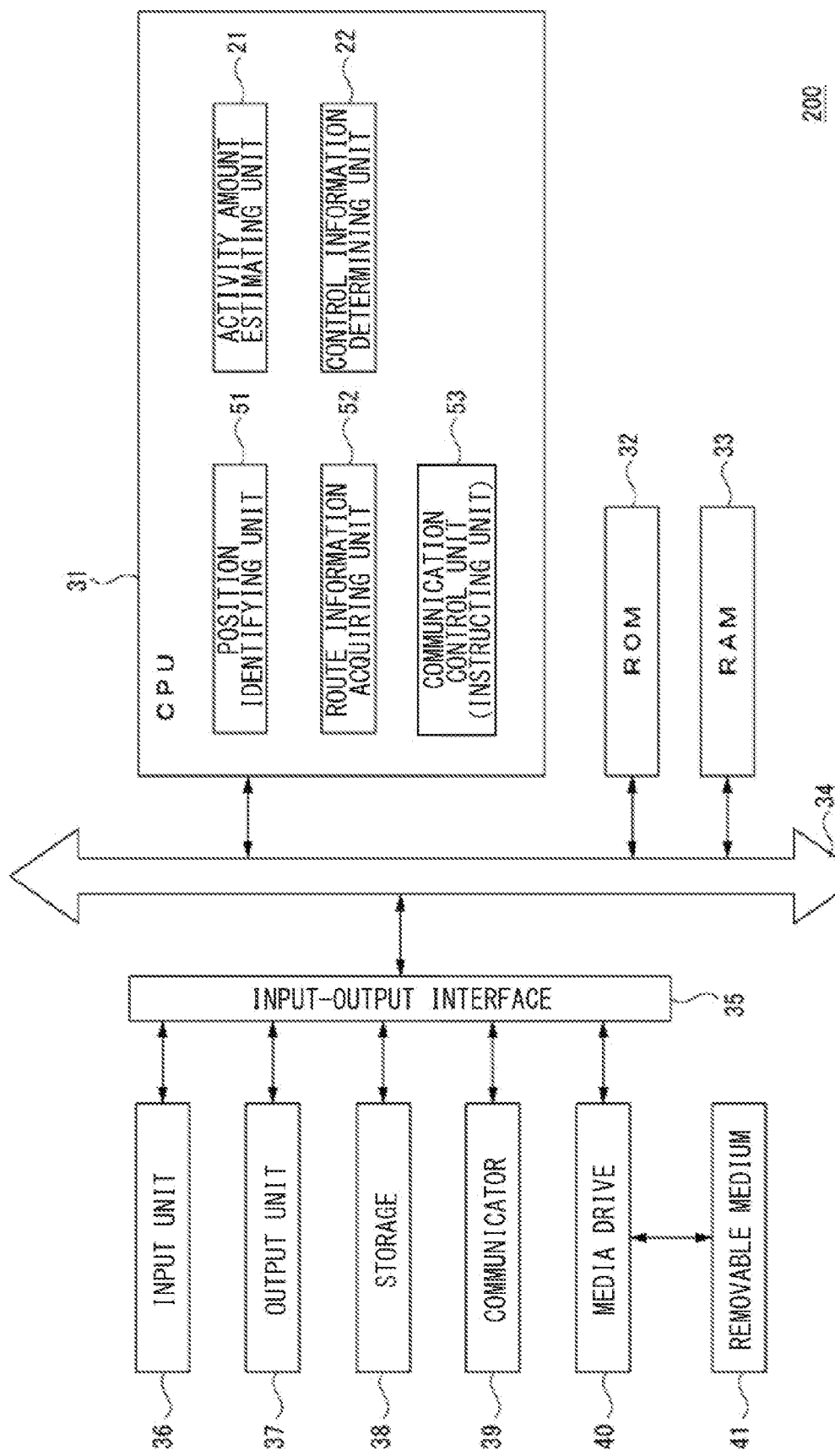
FIG. 13 is a diagram illustrating an example configuration of the user terminal in an example in which the user terminal determines control information for pre-air conditioning control.

FIG. 13 illustrates an example configuration of the user terminal 200 in such an example.

As illustrated in FIG. 13, the CPU 31 of the user terminal 200 may include the position identifying unit 51, the route information acquiring unit 52, the activity amount estimating unit 21, the control information determining unit 22, and the communication control unit 53 (the instructing unit 23). The position identifying unit 51 may identify information such as the position information of the vehicle 100, the position information of the user expected to ride in the vehicle 100, or information on the expected boarding position. The route information acquiring unit 52 may acquire the route information from the travel start position to the expected boarding position. The activity amount estimating unit 21 may estimate the amount of activity before boarding of the user who is expected to ride in the vehicle. The control information determining unit 22 may use the amount of activity and the route information, for example, to determine the set temperature and the control start timing serving as the control information to be used for the pre-air conditioning control. The communication control unit 53 (the instructing unit 23) may instruct the air conditioning control processor 9 of the vehicle 100 about the pre-air conditioning control.

In this case, the air conditioning control processor 9 of the vehicle 100 may perform the pre-air conditioning control on the basis of instruction information about the pre-air conditioning control transmitted from the user terminal 200. In other words, the air conditioning control processor 9 of the vehicle 100 may perform appropriate pre-air conditioning control by only performing the requested air conditioning control, without estimating whether the set temperature is to be attained at the expected boarding time, for example.

As described above, it is possible to perform the above-described pre-air conditioning control, achieving various example effects described above (or described later), as long as the position identifying unit 51, the route information acquiring unit 52, the activity amount estimating unit 21, the control information determining unit 22, and the communication control unit 53 (the instructing unit 23) are provided in either of the user terminal 200 and the vehicle 100.

Although the above examples describe the example of estimating the amount of activity of the user who is expected to ride in the vehicle, the pre-air conditioning control may be performed without estimating the amount of activity.

For example, the pre-air conditioning control processor 10 of the vehicle 100 may acquire information on the transportation mode and the travel time as the route information from the user terminal.

Correction values for the set temperature may be stored on the basis of the transportation mode and the travel time in the storage of the vehicle 100 or the DB 301 of the server 300. In one example, stored information may be like −1 degree for walking for less than 10 minutes, −2 degrees for walking for 10 minutes or more and less than 30 minutes, −3 degrees for walking for 30 minutes or more, −1 degree for riding a bicycle for less than 30 minutes, and so on.

The pre-air conditioning control processor 10 may acquire the correction value on the basis of the transportation mode and the transportation time acquired. The control information determining unit 22 of the pre-air conditioning control processor 10 may use the correction value to set the set temperature and the control start timing of the pre-air conditioning control.

The control unit (the instructing unit 23) of the pre-air conditioning control processor 10 may instruct the air conditioning control processor 9 about the pre-air conditioning control on the basis of the determined control information.

As described above, even in a configuration in which the amount of activity of the user is not estimated, it is possible to perform appropriate pre-air conditioning control on the basis of the route information of the user who is expected to ride in the vehicle, achieving example effects described above (or described later).

Furthermore, this configuration makes it possible to simply determine the control information to be used for the pre-air conditioning control, which helps to reduce processing load.

The above-described information such as the amount of activity or the coefficient may not only be calculated at timing of receiving the pre-air conditioning control start request, but may be calculated at any time while the user is traveling. For example, the user sometime changes the transportation mode on his/her way. As an example of such a case, the user may plan to travel by walking at first but switch the transportation mode to taxi because of rainy weather.

In such a case, the pre-air conditioning control processor 10 may re-acquire route information from the user terminal 200 each time the travel route is changed.

Thus, an appropriate set temperature may be re-set, making it possible to ensure the user's comfort when getting in the vehicle.

Even in a case where there is a change in the expected arrival time by the travel route being changed, the control start timing may be appropriately changed, which makes it possible to avoid an unnecessary increase in electric power consumption or failure to attain the set temperature by the expected arrival time, for example.

The above-described information about the user may be transmitted intermittently from the user terminal 200 to the vehicle 100 while the user is traveling to the expected boarding position. This makes it possible to keep the control information for the pre-air conditioning control in an optimum state, making it likely for appropriate pre-air conditioning control to be performed.

The processes described above may be executed by cooperative operation of the user terminal 200 installed with an application provided by a rent-a-car company and the pre-air conditioning control processor 10 of the vehicle 100.

For example, the rent-a-car company may provide a trip plan including collective reservation of a train and a rented car (the vehicle 100). The application of the rent-a-car company may operate on the user terminal 200 to acquire the position information of the vehicle 100, information on stations where to get on and get off the train, and when to get on and get off the train, for example, without receiving input from the user.

In such a case, by only making a trip while using the application, information to be used for starting of the pre-air conditioning control may be transmitted from the application to the vehicle 100, enabling the pre-air conditioning control processor 10 of the vehicle 100 to execute appropriate pre-air conditioning control.

The air conditioning control processor 9 and the pre-air conditioning control processor 10 may be configured in the same electronic control unit (ECU). Alternatively, the air conditioning control processor 9 and the pre-air conditioning control processor 10 may partly be configured in the same ECU, or the processors may be provided in two or more ECUs to be distributed. For example, the units of the air conditioning control processor 9 and the pre-air conditioning control processor 10 may partly be provided in the wireless communication processor 8.

The examples described above may be freely combined as appropriate, which makes it possible to achieve various example effects.

As described above, the vehicle control system 1 configured by the vehicle 100 and the user terminal 200 includes the position identifying unit 51, the route information acquiring unit 52, the control information determining unit 22, and the control unit (the instructing unit 23). The position identifying unit 51 identifies the expected boarding position where the occupant (user) is to get in the vehicle 100. The route information acquiring unit 52 acquires the route information of the occupant to the expected boarding position (e.g., information including the transportation mode and the travel time). The control information determining unit 22 determines the set temperature, the control start timing, or both as the control information to be used for pre-air conditioning control for the vehicle 100, on the basis of the route information. The control unit (the instructing unit 23) performs control such as the pre-air conditioning control on the basis of the control information.

The route information including the transportation mode and the travel time enables the pre-air conditioning control appropriate for the user (occupant) expected to ride in the vehicle 100 to be performed.

This makes it possible to ensure the user's comfort when getting in the vehicle. Setting the control start timing appropriately makes it possible to suppress a decrease in travelable distance due to unnecessary consumption of electric power.

As described in the configuration of the vehicle 100, the control information determining unit 22 in the vehicle control system 1 may determine the control start timing on the basis of the expected arrival time of the occupant (user) at the expected boarding position calculated on the basis of the route information.

Thus, the pre-air conditioning control may be performed on the basis of the control start timing appropriately determined on the basis of the expected arrival time.

This makes it possible to suppress a decrease in the travelable distance due to consumption of more than necessary electric power for the pre-air conditioning control.

As described in the configuration of the vehicle 100, the route information that is information to be treated by the vehicle control system 1 may include the information on the transportation mode to be used by the user to travel and the information on the travel time.

Thus, the set temperature desired by the user may be estimated on the basis of information on not only the transportation mode but also the time length (travel time) of the travel using the transportation mode.

This makes it possible to perform pre-air conditioning control corresponding to the set temperature suitable for a state of the user, which helps to ensure the user's comfort when getting in the vehicle.

As described in the configuration of the vehicle 100 and the first example embodiment, for example, the vehicle control system 1 may include the activity amount estimating unit 21 that estimates the amount of activity before boarding of the occupant (user) on the basis of the route information, and the control information determining unit 22 may determine the set temperature on the basis of the estimated amount of activity.

The amount of activity may be, for example, an index of the amount of exercise of the user, and may also be referred to as an index corresponding to the amount of perspiration, the body temperature, or the degree of fatigue of the user.

The vehicle control system 1 including the activity amount estimating unit 21 enables, even in a case where the same user arrives at the vehicle at the same expected arrival time, the amount of activity of the user to be estimated differently depending on a difference in the transportation mode and the travel time.

Therefore, an appropriate temperature corresponding to a situation may be set even for pre-air conditioning control for the same user, making it possible to provide the vehicle compartment space 101 that is comfortable for the user when the user gets in the vehicle 100. Setting the appropriate set temperature makes it possible to avoid unnecessary electric power consumption.

As described in the first example embodiment, for example, the activity amount estimating unit 21 of the vehicle control system 1 may, in a case where the route information includes two or more transportation modes, estimate the amount of activity on the basis of the transportation mode to be last used and the time length of the use of the last transportation mode.

Thus, for example, the individual amounts of activity for transportation modes other than the transportation mode to be last used may not be calculated.

This makes it possible to appropriately perform the pre-air conditioning control, while reducing processing load.

As described in the configuration of the user terminal 200, the route information to be received by the vehicle control system 1 may be the route information of the occupant (user) from the current position to the expected boarding position.

Thus, in a case of using the current position information acquired by the user terminal 200 as information on the travel start position of the route information, it is unnecessary for the user to input the information on the travel start position.

This improves convenience of the user. It is also possible to prevent erroneous input, for example, making it likely for optimum pre-air conditioning control to be executed.

The vehicle control system 1 described above may include the user terminal 200 including the position identifying unit 51 and the route information acquiring unit 52, and an on-vehicle device (the pre-air conditioning control processor 10) including the control information determining unit 22 and the control unit (the instructing unit 23).

The pre-air conditioning control processor 10 serving as the on-vehicle device configuring the vehicle control system 1 described above includes the control information determining unit 22 and the control unit (the instructing unit 23). The control information determining unit 22 determines the set temperature, the control start timing, or both as the control information to be used for pre-air conditioning control for the vehicle 100, on the basis of the route information to the expected boarding position where the occupant is to get in the vehicle 100. The control unit (the instructing unit 23) performs control such as the pre-air conditioning control on the basis of the control information.

The vehicle control system 1 and the pre-air conditioning control processor 10 described above make it possible to perform the above-described pre-air conditioning control, making it possible to provide the vehicle compartment space 101 that is comfortable when the user gets in the vehicle 100.

Figure 2:
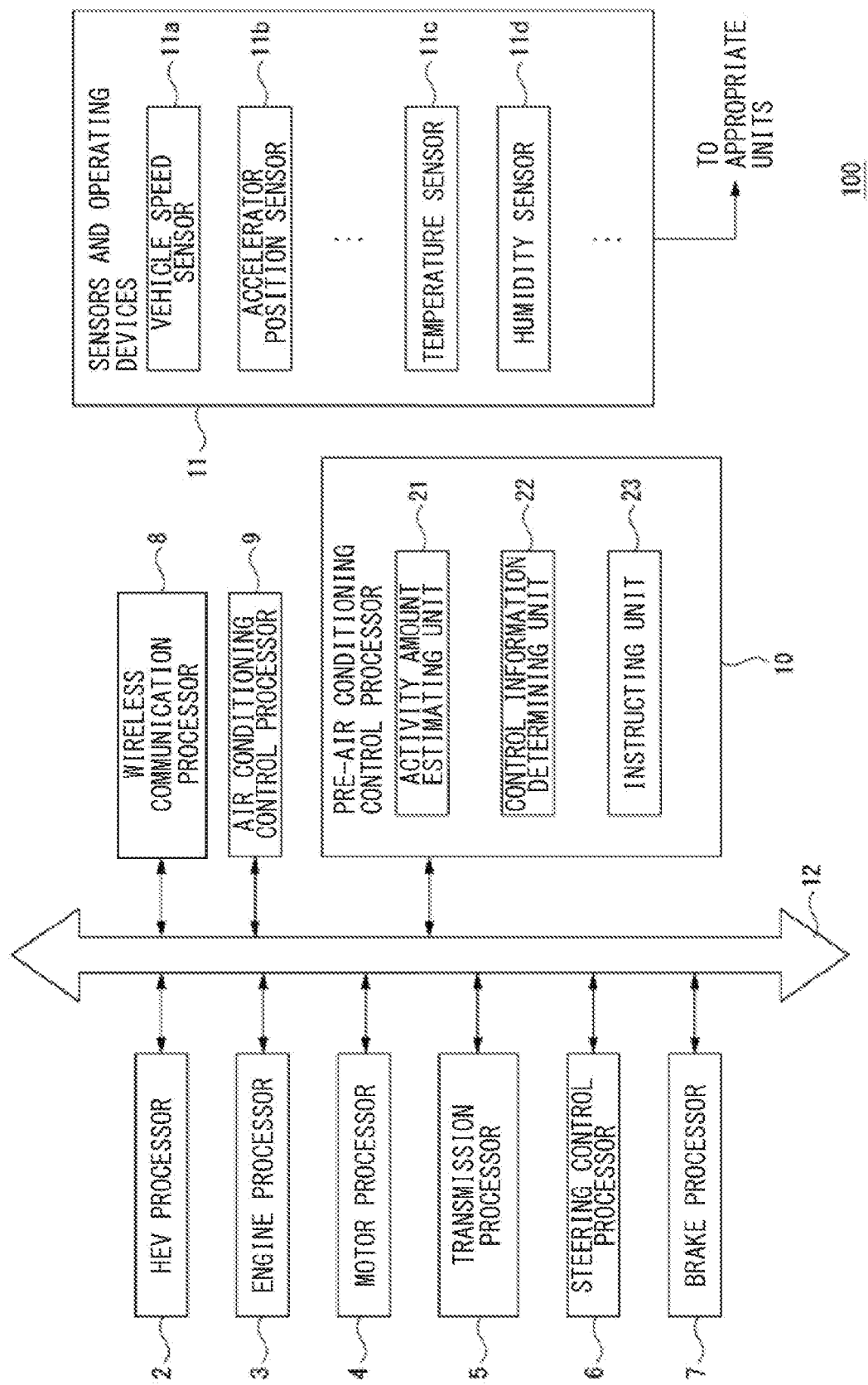
FIG. 2 is a diagram illustrating an example configuration of the vehicle.

Each of the position identifying unit 51, the route information acquiring unit 52, the activity amount estimating unit 21, the control information determining unit 22, and the communication control unit 53 (the instructing unit 23) illustrated in FIGS. 2 and 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the position identifying unit 51, the route information acquiring unit 52, the activity amount estimating unit 21, the control information determining unit 22, and the communication control unit 53 (the instructing unit 23). Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the position identifying unit 51, the route information acquiring unit 52, the activity amount estimating unit 21, the control information determining unit 22, and the communication control unit 53 (the instructing unit 23) illustrated in FIGS. 2 and 3.

Although some example embodiments and modification examples of the technology are described hereinabove, the foregoing embodiments and modification examples are mere examples and are not intended to limit the scope of the technology. It should be also appreciated that various omissions, replacements, and modifications may be made in the foregoing embodiments and modification examples described herein, without departing from the scope of the technology. The technology is intended to include such modifications and alterations in so far as they fall within the scope of the appended claims or the equivalents thereof.

The invention claimed is:

1. A vehicle control device comprising:
memory configured to store activity amount information that associates amount of activities per unit time with each of a plurality of transportation modes; and
one or more processors communicably coupled to the memory and configured to:
determine, on a basis of the activity amount information and route information of an occupant to an expected boarding position where the occupant is to get in a vehicle, a set temperature to be used for pre-air conditioning control for a vehicle compartment space of the vehicle; and
perform at least the pre-air conditioning control on a basis of the set temperature,
wherein the route information includes a last transportation mode to be last used by the occupant until the occupant reaches the expected boarding position, and a last travel time of use of the last transportation mode,
wherein the one or more processors are configured to i) calculate, on a basis of the activity amount information, the last transportation mode and the last travel time, a first amount of activity that indicates an amount of exercise of the occupant in a travel by using the last transportation mode and ii) determine the set temperature so that the set temperature is lower as the first amount of activity is larger.

2. A vehicle control system comprising:
memory configured to store activity amount information that associates amount of activities per unit time with each of a plurality of transportation modes; and
circuitry communicably coupled to the memory and configured to:
identify an expected boarding position where an occupant is to get in a vehicle,
acquire route information of the occupant to the expected boarding position, the route information includes a last transportation mode to be last used by the occupant until the occupant reaches the expected boarding position, and a last travel time of use of the last transportation mode,
calculate a first amount of activity on a basis of the activity amount information, the last transportation mode and the last travel time, the first amount of activity indicates an amount of exercise of the occupant in a travel by using the last transportation mode;
determine, on a basis of the first amount of activity, a set temperature so that the set temperature is lower as the first amount of activity is larger; and
perform pre-air conditioning control for a vehicle compartment space of the vehicle on a basis of the set temperature.

3. A vehicle control device comprising:
memory configured to store activity amount information that associates amount of activities per unit time with each of a plurality of transportation modes; and
circuitry communicably coupled to the memory and configured to:
determine, on a basis of the activity amount information and route information of an occupant to an expected boarding position where the occupant is to get in a vehicle, a set temperature to be used for pre-air conditioning control for a vehicle compartment space of the vehicle, and
perform at least the pre-air conditioning control on a basis of the set temperature, wherein the route information includes a last transportation mode to be last used by the occupant until the occupant reaches the expected boarding position, and a last travel time of use of the last transportation mode,
wherein the circuitry is configured to i) calculate, on a basis of the activity amount information, the last transportation mode and the last travel time, a first amount of activity that indicates an amount of exercise of the occupant in a travel by using the last transportation mode and ii) determine the set temperature so that the set temperature is lower as the first amount of activity is larger.

4. The vehicle control device according to claim 1, wherein the activity amount information includes a first amount of activity per unit of time associated with a first transportation mode and a second amount of activity per unit of time associated with a second transportation mode, the first transportation mode is walking, the second transportation mode is train, the first amount of activity per unit of time is larger than the second amount of activity per unit of time.

5. The vehicle control device according to claim 4, wherein the one or more processors correct the first amount of activity per unit of time so that the first amount of activity per unit of time is larger as an amount of baggage of the occupant is larger.

6. The vehicle control device according to claim 1, wherein the route information further includes a second transportation mode to be used in addition to the last transportation mode until the occupant reaches the expected boarding position and a second travel time of use of the second transportation mode,
wherein the one or more processors are configured to:
calculate a second amount of activity on a basis of the activity amount information, the second transportation mode and the second travel time, the second amount of activity indicates an amount of exercise of the occupant in a travel by using the second transportation mode; and determine the set temperature on a basis of a sum of the first amount of activity and second amount of activity so that the set temperature is lower as the sum of the first amount of activity and second amount of activity is larger.

\* \* \* \* \*